United States Patent [19]

Huang et al.

[11] Patent Number: 5,944,195

[45] Date of Patent: *Aug. 31, 1999

[54] METHOD FOR SEPARATION OF SOLIDS FROM DRILLING FLUIDS BY MAGNETIC SEPARATION AND CENTRIFUGATION

[75] Inventors: Pin Y. Huang; Yuh-Hwang Tsao; Janardhan Davalath, all of Houston, Tex.

[73] Assignee: Exxon Production Research Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,470

[22] Filed: Jul. 3, 1996

Related U.S. Application Data

[60] Provisional application No. 60/000,802, Jul. 5, 1995.

[51] Int. Cl.[6] .................................. B03C 1/30; C09K 7/00
[52] U.S. Cl. ............................ 209/39; 209/214; 209/725; 175/66; 175/206
[58] Field of Search .................................. 209/3, 12.1, 39, 209/213, 214, 231, 232, 724, 725; 175/57, 66, 206

[56] References Cited

U.S. PATENT DOCUMENTS

| | | | |
|---|---|---|---|
| 2,276,075 | 3/1942 | Wuensch | 252/8.5 |
| 3,713,499 | 1/1973 | Arscott et al. | 175/66 |
| 3,774,702 | 11/1973 | Elenburg | 175/66 |
| 3,920,543 | 11/1975 | Marston et al. | 209/222 |
| 3,976,557 | 8/1976 | Shen et al. | 208/10 |
| 4,234,420 | 11/1980 | Turbeville | 209/39 X |
| 4,299,694 | 11/1981 | Goodell | 209/39 X |
| 4,342,640 | 8/1982 | Lewis | 208/11 R |
| 4,539,102 | 9/1985 | Boston et al. | 209/38 |
| 4,906,382 | 3/1990 | Hwang | 210/695 |

FOREIGN PATENT DOCUMENTS

| | | | |
|---|---|---|---|
| 9424411 | 10/1994 | WIPO | 175/66 |

OTHER PUBLICATIONS

H. Kolm, J. Oberteuffer and D. Kelland, *Scientific American*, "High–Gradient Magnetic Separation", 1975, v 233, No. 5, pp. 46–54.

D. Menzel, "A New Weighting Material for Drilling Fluids Based On Synthetic Iron Oxide", *Society of Petroleum Engineers of AIME, SPE #4517;* Copyright 1973.

N. R. Iammartino; "New Tasks for Magnetism"; *Chemical Engineering;* Jan. 7, 1974; pp. 50–52.

*Primary Examiner*—Tuan N. Nguyen
*Attorney, Agent, or Firm*—Gary D. Lawson

[57] ABSTRACT

A method is disclosed for treating drilling mud discharged from a well wherein the mud contains drill cuttings and paramagnetic materials such as hematite. The drilling mud is first passed through a high-gradient magnetic separator to separate the paramagnetic materials from the drilling mud. The drilling mud is then passed through a centrifuge separator to remove the drill cuttings from the drilling mud.

6 Claims, 3 Drawing Sheets

METHOD FOR SEPARATION OF SOLIDS FROM DRILLING FLUIDS BY MAGNETIC SEPARATION AND CENTRIFUGATION

This application is based on copending U.S. provisional patent application, Ser. No. 60/000,802 filed in the name of P. Y. Huang et. al on Jul. 5, 1995.

FIELD OF THE INVENTION

This invention relates to a method for removing solids entrained in a liquid, and more particularly to a method for separating and removing low-gravity solids from a drilling fluid that contains high-gravity, paramagnetic weighting material.

BACKGROUND OF THE INVENTION

In the drilling of oil and gas wells by the rotary method, drilling fluid, commonly called "mud", is used to remove drill cuttings from the well. The mud circulates down through a drill string and out a drill bit at the lower end of the drill string and then circulates up through the wellbore to the earth's surface. Drill cuttings are removed from the mud by solids control equipment such as shale shakers and hydrocyclones, and the mud is recirculated back into the wellbore.

As the well depth increases, so does the earth's pressure. For effective well control in deep wells, the mud must be weighted with materials having a high specific gravity to prevent unwanted entry of formation fluids into the wellbore. Known weighting materials include barite, galena, lead oxide, barium carbonate, and iron oxide. Naturally occurring iron oxide, principally hematite ($Fe_2O_3$), was among the first materials used in the oil and gas industry to increase the mud density. However, use of iron oxides was largely discontinued in the early 1940s when ample supplies of barite became available. While barite continues to be the most common weighting material for drilling fluids, as the world's supply of barite dwindles, the use of iron oxide is increasing.

Since large quantities of weighting material are needed in drilling an oil well, it is desirable to recover the material and recycle it. Various solids control systems are in use today for separating the drill cuttings from the mud so that the mud's liquid component and the mud's weighting material can be recycled, leaving only drill cuttings for disposal. Most systems use a combination of one or more screens or sieves in a series relationship, with a final separating step using a mud cleaner or one or more centrifuges.

When hematite is used as the weighting material, magnetic separators have been proposed for separating the paramagnetic hematite from the mud. For example, SPE Paper Number 4517, entitled "A New Weighting Material for Drilling Fluids Based on Synthetic Iron Oxide" (presented at the 48th Annual Fall Meeting of the Society of Petroleum Engineers in 1974) proposed using a wet magnetic separator for removing a hematite-based weighting material. The SPE paper further suggests that in place of a magnetic separator a centrifuge separator can be used to remove the weighting material. There is no suggestion in the SPE paper of using a magnetic separator and centrifuge separator in combination.

As the cost of waste disposal increases, there is a growing incentive to reduce the volume of drilling waste. One way of reducing this volume is to reduce the amount of liquid discharged with the drill cuttings. A mud treating system's effectiveness is measured by the amount of liquid recovered for reuse in the drilling operation. Ideally, a solids control system discharges the drill cutting in a dry state, but most systems in use today discharge substantial volumes of liquid with the drill cuttings.

While many solids control systems have been used in the oil and gas industry, there continues to be a need for a more efficient system for recovering weighting materials and at the same time removing drill cuttings with a minimum amount of liquid.

SUMMARY OF THE INVENTION

It has been discovered in accordance with the present invention that several advantages and benefits over prior solids control systems can be achieved by using a paramagnetic weighting material in a drilling fluid and using a two-step process for recovering the paramagnetic material and liquids used in the drilling fluid, leaving drill cuttings to be discarded. The first step in the treatment process is to pass the drilling fluid through a high-gradient magnetic separator to separate and recover the paramagnetic weighting material from the drilling fluid. The recovered weighting material is preferably returned to the active drilling system. In the second step, the drilling fluid from the magnetic separator is passed to a centrifuge separator for further removal of solids. Effluent from the centrifuge is returned to the active mud system and underflow from the centrifuge is discharged as waste.

An advantage of the invention is the reduced amount of liquid discharged with the drill cutting, which can significantly reduce the cost of waste disposal. Another advantage is the enhanced recovery of the paramagnetic weighting material in the drilling fluid. Further advantages and features of the invention not apparent from the above discussion will become evident upon consideration of the following description of the invention taken in connection with the accompanying drawings.

These Figures illustrate one embodiment of the invention, and are not intended to exclude from the scope of the invention other embodiments set out herein or which are the result of normal and expected modifications of this specific embodiment.

DESCRIPTION OF THE PREFERRED EMBODIMENTS

This invention is generally applicable to separation of low-gravity solids from a drilling fluid that contains high-gravity, paramagnetic weighting agents. Drilling fluid from a drilling mud system is passed through a high-gradient magnetic separator to remove at least a portion of the high-gravity, paramagnetic agents. The separated weighting agents can then be returned to the active mud system for reuse. At least part of the drilling fluid that exits the magnetic separator is then passed to a centrifuge separator for removal of the low-gravity drill cuttings, which are less magnetic than the paramagnetic weighting agents. The effluent from the centrifuge may be returned to the active mud system and the underflow, containing primarily low-gravity drill cuttings, may be discarded.

For purposes of clarity, only one of the many uses of the invention is described in detail. In this description, the drilling fluid, or mud, is water-based. However, the invention may also be used in treating oil-based drilling fluids.

Figure 1:
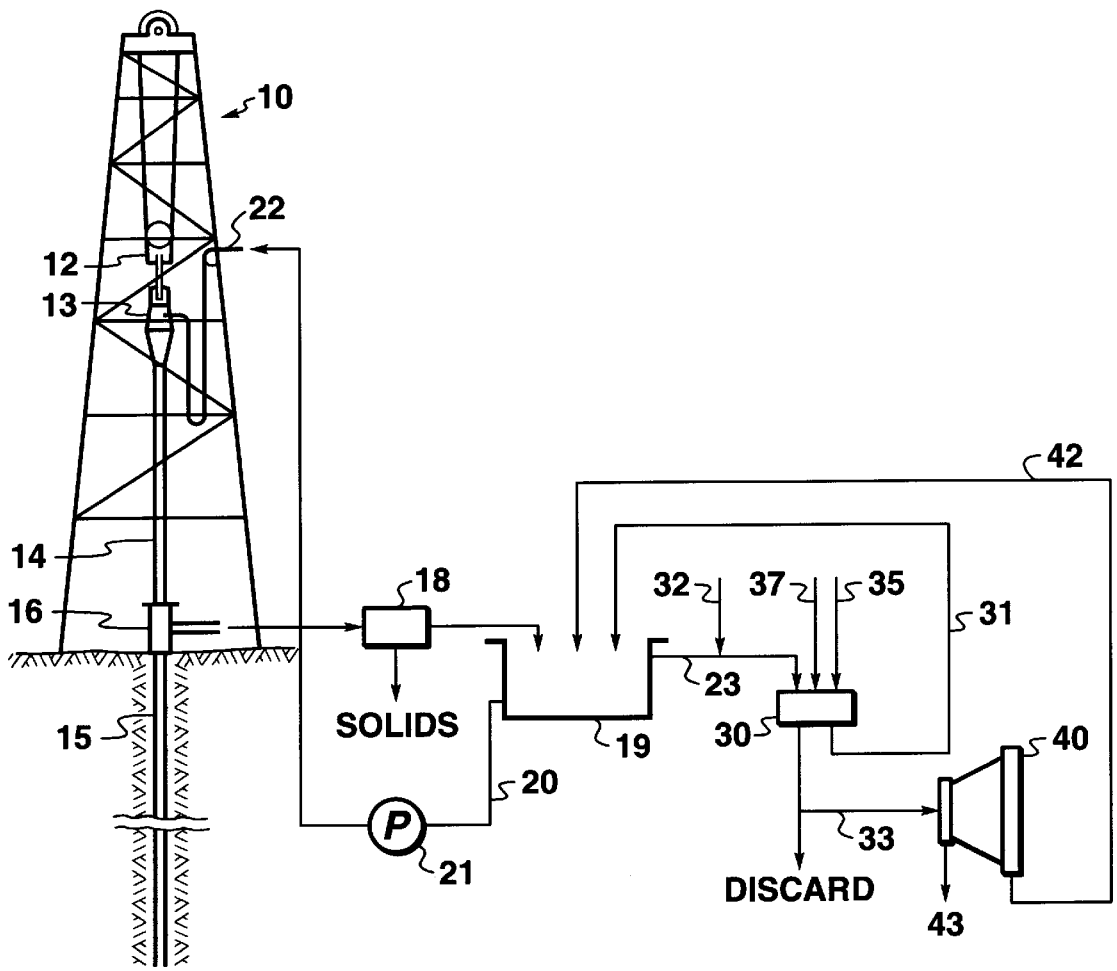
FIG. 1 is a generalized schematic diagram of a drilling and mud circulation system broadly encompassing the invention.

Referring to FIG. 1, reference numeral 10 designates a conventional derrick having suspended from its top the usual traveling block 12 supporting swivel 13, which in turn supports the kelly 14 which rotates the drill string 15 connected thereto in the wellbore by means of a rotary table (not shown). From the wellhead 16, drilling fluid passes from the well through a screen 18, such as a vibrating screen, to remove coarse drill cuttings. The remaining drilling fluid then passes into a mud pit 19, shown in FIG. 1 as a single pit although several pits or one or more tanks may be used. From the mud pit 19, the drilling fluid returns to the well by means of the mud pipe 20, pump 21, and the flexible hose 22 to swivel 13. All of these elements, including various pumps to assist the flow, such as suction pumps and the like, are well known to those skilled in the art of drilling oil and gas wells.

In the practice of this invention, some of the drilling fluid is taken from the mud pit 19 and passed through line 23 to a high gradient magnetic separator 30 to separate more-magnetic, high-gravity solids from the less-magnetic, low-gravity solids and drilling liquid. The liquid containing the low-gravity, less-magnetic solids are discharged from magnetic separator 30 and are passed through line 33 to a centrifuge separator 40 with a portion optionally discharged as waste. For economic reasons, however, in most applications all fluid flow through line 33 will preferably be directed to centrifuge 40. The more-magnetic, high-gravity solids are flushed from magnetic separator 30 by a flushing fluid, preferably drilling fluid taken from mud pit 19, that is introduced into the separator 30 through line 35. The paramagnetic materials flushed from magnetic separator 30 are preferably returned to the mud pit 19 through line 31 for reuse as a weighting material in the drilling fluid.

Centrifuge separator 40 removes a sufficient amount of low-gravity, less-magnetic solids 43 suspended in the drilling fluid so that the effluent can be sent through line 42 back to mud pit 19 for reuse in the drilling fluid system. If the effluent is not needed, the effluent can be directed to reserve pits (not shown) for other uses.

The centrifuge separator 40 used in the invention can be obtained from drilling equipment suppliers and is well known to those skilled in the art of drilling oil and gas wells. Therefore, no further description of the centrifuge separator 40 is necessary.

The magnetic separator 30 can comprise any high-gradient magnetic separator that will produce a magnetic field of at least about 3000 gauss and preferably from about 5000 to about 20,000 gauss. The magnetic separator can comprise a type having fluid flow passages containing a magnetizable metal matrix material, such as steel wool, steel balls, wire mesh, steel plates, or the like.

The magnetic separator 30 is preferably a unit adapted for continuous flow use, wherein the magnetizable metal matrix surfaces are moved into and out of the magnetic field cyclically. During the time the magnetizable matrix surfaces are within the magnetic field, the paramagnetic solids are substantially retained on the matrix surfaces within the fluid flow passages. When the matrix moves out of the magnetic field, the matrix surfaces lose magneticity. A flushing fluid stream from line 35 is passed through the spaced matrix passages to flush out the trapped paramagnetic solids from the matrix surfaces.

Figure 2:
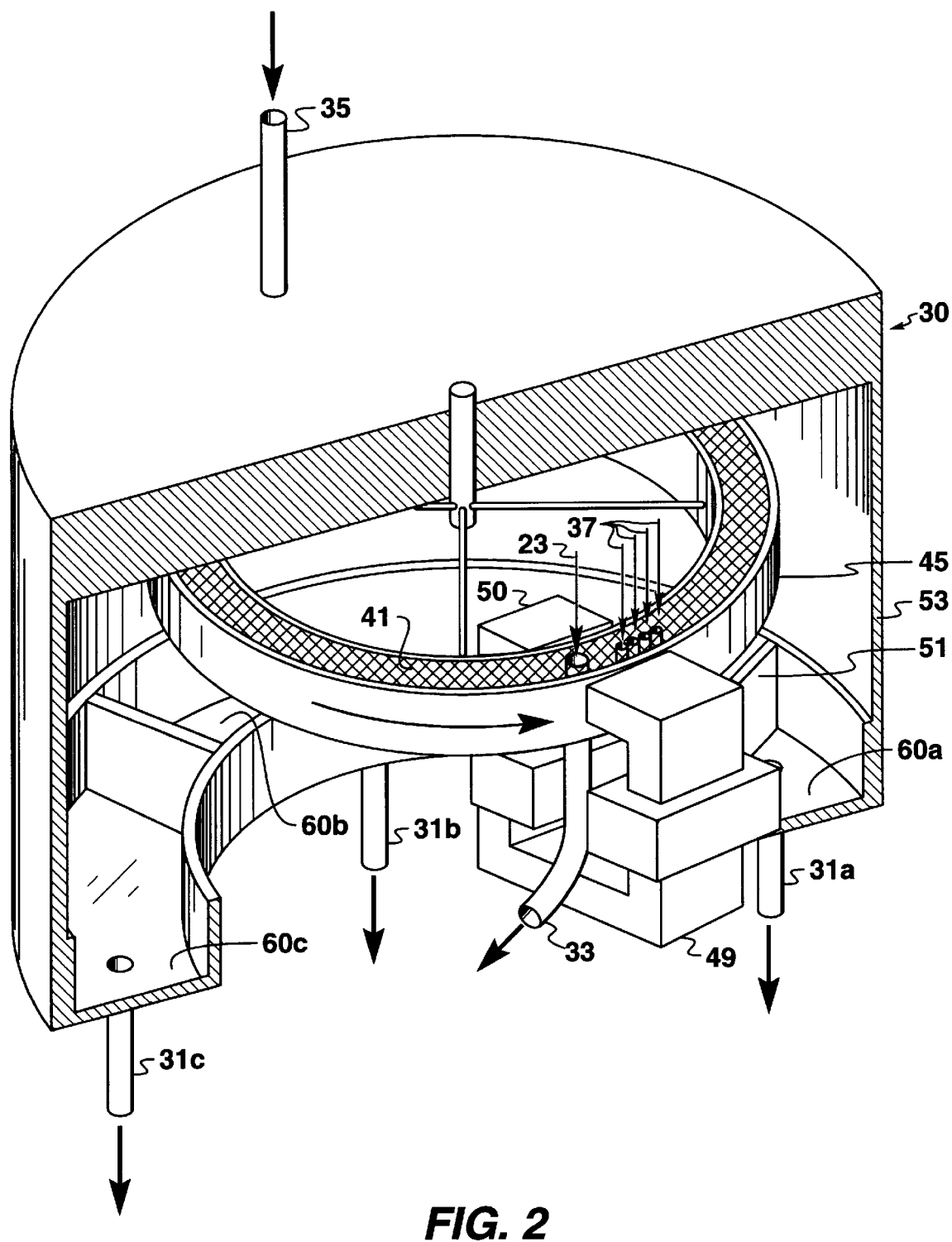
FIG. 2 is a partial sectional, isometric view of a carousel magnetic separator suitable for use in the invention, with a portion of the separator's housing cut away to illustrate the separator's rotating carousel.

One type of magnetic separator suitable for use in the practice of the invention is a carousel separator 30 depicted in a schematic view in FIG. 2. Carousel separator 30 has a carousel member 45 which rotates continuously in a horizontal plane within separator housing 53 which receives drilling fluid through inlet pipe 23. Treated fluid, containing predominantly clay, drill solids, chemicals, and water, exits the separator through outlet pipe 33. The carousel member 45 is constructed as a single continuous annulus containing matrix material 41, which may be expanded metal, grooved plates, steel wire mesh, steel balls, or the like. The paramagnetic solids are substantially retained on closely-spaced magnetizable metal surfaces of matrix material 41. The matrix material 41 passes between a pair of horizontally spaced magnetic poles 50 and 51 of a permanent electromagnet 49.

Figure 3:
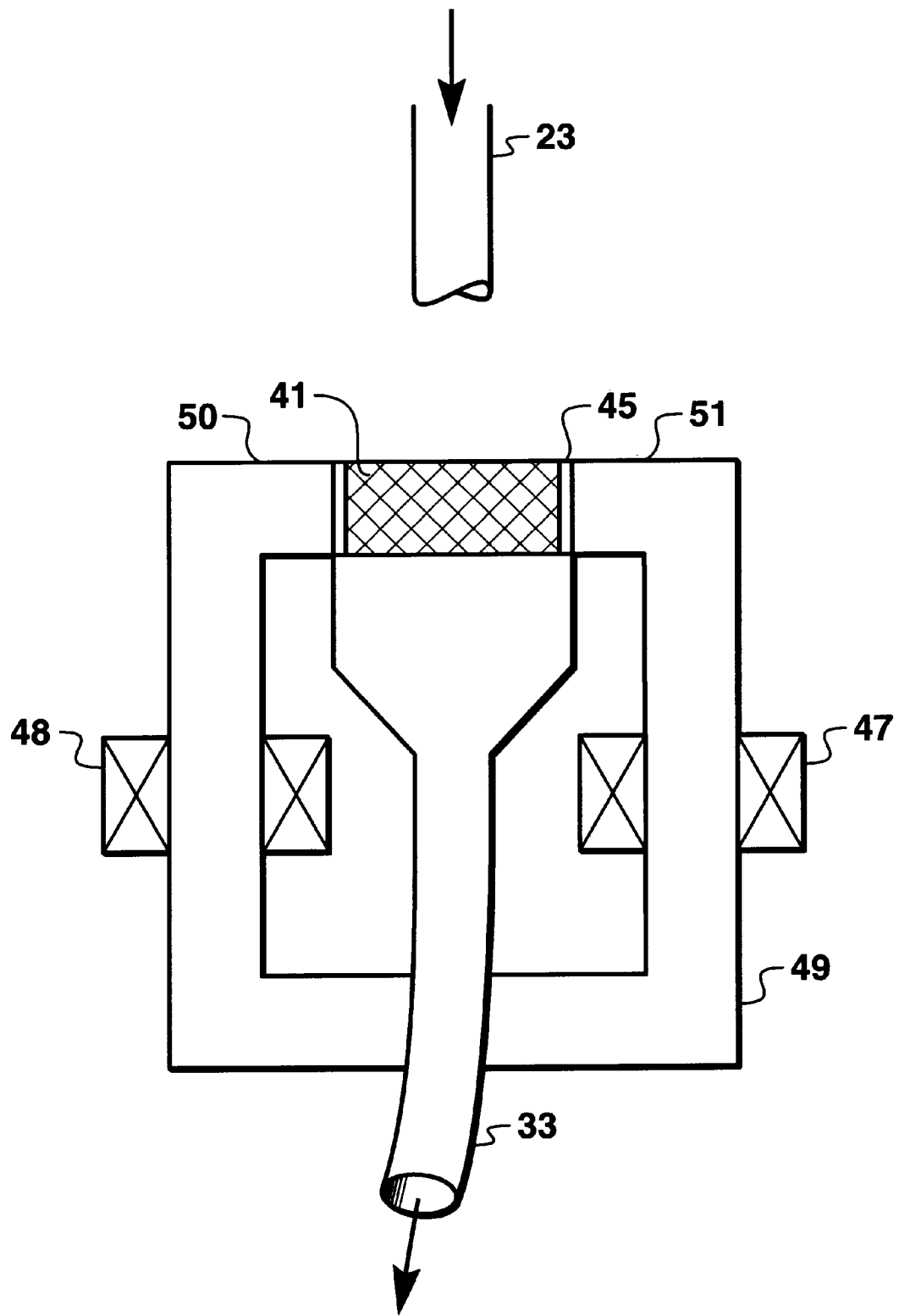
FIG. 3 is a diagrammatic sectional side view of flow conduits through a magnetic matrix of the separator shown in FIG. 2.

FIG. 3 shows a diagrammatic sectional side view of matrix material 41 of carousel member 45 between south pole 50 and north pole 51 of the permanent electromagnet 49. The fluid flow, field, and matrix motion are each in mutually perpendicular directions. The force of gravity moves the drilling fluid through the matrix material 41. After the matrix material 41 with paramagnetic material attached to it rotates out of the magnetic field between the magnetic poles 50 and 51, the paramagnetic material is flushed from the matrix by action of a flush fluid, preferably drilling fluid from the mud pit 19. The flush fluid passes through inlet line 35 (FIG. 2), flushing the paramagnetic solids from the matrix material 41, with the flush fluid and solids draining from the separator 30 primarily through lines 31b, with lesser amounts through line 31c. Lines 31b and 31c (not shown in FIG. 1) merge to line 31. Between the zone of the carousel that receives flushing fluid through line 35 and the zone of the carousel that passes through the magnetic field, some paramagnetic materials, non-magnetic materials, and liquid percolate through the matrix into collecting tray 60a and exits the separator 30 through line 31a. Depending on the purity of paramagnetic materials in line 31a, the fluid flowing through line 31a may optionally be combined with fluid in line 33 to enhance the purity of the recovered paramagnetic material in line 31. For economic reasons, fluid from line 33 is processed with the centrifuge separator 40 to remove low gravity solids. Overflow from the centrifuge separator 40 may be returned back to the active system through line 42.

Although FIG. 2 shows only one feed inlet 23 and only one rinse inlet 35, a plurality of feed inlets and rinse inlets may be spaced about carousel member 45. The drilling fluids may also be passed through a pre-scalper (not shown in the Figs.) prior to entry into separator 30 to remove any highly magnetic particles such as magnetite, iron filings, or loose bolts. Magnetic scalpers are commercially available and are known to those skilled in the art of designing solids control systems for drilling operations.

The magnetic field strength required for effective separation of the paramagnetic weighting material depends on the temperature and viscosity of the drilling fluid and the magnetic susceptibility of the weighting material. For particles that are slightly magnetic, relatively high magnetic field strengths are required to effect a useful separation, particularly if the flowing slurry is moderately to highly viscous (50 to 100 centipoise).

The weighting agents used in the invention should have a magnetic susceptibility above about $100\times10^{-6}$ cgs/g, and preferably above $200\times10^{-6}$ cgs/g. Examples of such weighting materials include hematite ($Fe_2O_3$) and itabirite ($Fe_2O_3+$ SiO).

Barite and other weighting agents having a magnetic susceptibility below about $100\times10^{-6}$ cgs/g can be used as a weighting agent in accordance with this invention if such agents are made more magnetically susceptible. Magnetic susceptibility can be increased by adsorption of a magnetic material to the weighting agent. Techniques for increasing the magnetic susceptibility of a non-magnetic material are known to those skilled in the art. One example of a technique for increasing magnetic susceptibility is described in U.S. Pat. No. 4,906,382.

The weighting agent used in drilling fluids should not be so highly magnetically susceptible that it flocculates or clings to well components, thereby interfering with the function of the drilling fluid. Magnetite ($Fe_3O_4$), for example, having a magnetic susceptibility of about $96,500\times 10^{-6}$ cgs/g, is too highly magnetic to be an effective weighting agent in most drilling fluid applications. Preferably, the weighting agent's magnetic susceptibility is less than about $4,000\times10^{-6}$ cgs/g.

Viscosity of the drilling fluid passed through the magnetic separator may be adjusted by varying the liquid composition of the fluid stream to be treated or by varying its temperature, or both. Preferred operating condition for the drilling fluid flowing into the magnetic separator are temperatures from about 25° C. to 70° C. and slurry viscosities from about 3 centipoise to 30 centipoise. The particle size of the paramagnetic solids in the drilling fluid is a matter of choice, but is preferably less than about 100 microns.

To reduce the viscosity of the drilling fluid and enhance the effectiveness of the magnetic separator, both air and water, or air alone or water alone, may be introduced through conduit 37 to the matrix material 41 in the magnetic field of the separator 30. This air and/or water is introduced simultaneously with introduction of drilling fluids to magnetic field of the separator 30. Optionally, water may be added to the drilling fluid through line 32 to dilute the drilling fluid. The ratio of the volume of dilution water to drilling fluid preferably ranges from about 0.2 to 1.25 depending on the weight of the drilling fluid.

The invention may be better understood by reference to the following examples which are offered to demonstrate utility of the invention and are not intended to be limited or restrictive thereof and are not intended as limiting the scope of the invention as defined in the appended claims.

EXAMPLES

The drilling of a hypothetical well is used to illustrate the benefits of using a combination of magnetic separator and centrifuge separator for removing drill solids from a drilling fluid compared to use of a centrifuge alone or use of a magnetic separation alone. The well used in this hypothetical example is 7520 feet deep of which 3200 feet is drilled with a 10½ inch bit with an assumed actual hole diameter of 12.1 inches and 4320 feet is drilled with 8½ inch bit with an assumed actual hole diameter of 9.7 inches. The well is drilled with a water-based drilling mud having a weight of 17.5 pounds per gallon when the 10½ inch bit is used and 16.5 pounds per gallon when the 8½ inch bit is used. The mud is weighted with hematite. It is assumed that the drilling fluid will be diluted with fresh water at a volume ratio of 1:1.

In this example, it is further assumed that 82 volume percent of the drill solids will be removed by the solids control system. The remaining 18 volume percent of the drill solids will remain in the drilling fluid. Of the 82 volume percent of the drilling solids, 50% of the total (41 volume percent of the drill solids) will be removed by conventional shale shakers. The remaining 50% will be removed by one of three processes: (1) a centrifuge separator only, (2) a magnetic separator only, and (3) combination of magnetic separator and centrifuge separator.

Centrifuge Separator Alone

To drill the well of this example based on the assumptions set forth above, the solids control system would produce about 23,000 barrels of total waste, which would comprise water, drill solids, and weighting material. A centrifuge separator alone would discard about 1,166,500 pounds of hematite from the system. These estimates are based on the assumptions that (1) 80% of the weighting material will be recovered in the underflow and recycled back to the active mud system and (2) only 55% of the low gravity solids in the mud fed to the centrifuge will be removed through the overflow, with the remaining 45% of the low gravity solids being recycled back to the active mud system.

Magnetic Separator Alone

When the magnetic separator is used alone, this example assumes that all less-magnetic solids are discharged as waste and that 75% of the hematite is recovered and recycled back to the active mud system. To drill the hypothetical well described above and based on the assumptions outlined for this example, the solids control system using a magnetic separator would produce about 14,000 barrels of total waste, which would comprise water, drill solids, and weighting material. About 966,000 pounds of hematite will also be removed from the system.

Magnetic Separator and Centrifuge Separator Together

When a magnetic separator and centrifuge separator are used together, it is assumed that 50 volume percent of the non-magnetic liquid discharged by the magnetic separator is discharged as waste to avoid accumulation of fine solids in the drilling fluid. The remaining 50% of the non-magnetic discharge is processed by the centrifuge separator. Since a centrifuge usually removes 40–60 weight percent of low-gravity solids, it is further assumed that the centrifuge separator recovers 50 weight percent of the low-gravity solids fed to the centrifuge separator. To drill the well of this example based on the assumptions outlined for this example, the solids control system using a magnetic separator and centrifuge combination would produce 10,000 barrels of total waste and discard around 909,000 pounds of hematite. Results of these three solids control systems when applied to the above well are summarized in Table 1. Results in Table 1 indicate that the magnetic/centrifuge combination is more efficient then centrifuge separators alone or magnetic separators alone.

TABLE 1

| RUN | HEMATITE DISPOSED (Lbs.) | VOLUME DISPOSED (Barrels) |
| --- | --- | --- |
| Centrifuge Separator only | 1,166,500 | 23,000 |
| Magnetic Separator only | 966,000 | 14,000 |
| Magnetic Separator and Centrifuge Separator | 909,000 | 10,000 |

Effect of washing with water

The effect of introducing water and air in the separation zone of a magnetic separator in this invention was tested on a field pilot scale. The tests were performed using a carousel magnetic separator manufactured by Boxmag Rapid Limited of England as model HIW1. The tests were performed using a drilling fluid having a density of 16 pound per gallon and containing four volume percent solids of which two volume percent was drilled solids. The fluid was weighted with Desimix #1044 which is sold commercially by Densitech of Houston, Tex. The magnetic separator had the following characteristics:

| | |
|---|---|
| Magnetic field strength: | 12,000 gauss |
| Matrix configuration | Alternating vertical and horizontal, medium expanded metal |
| Matrix material: | Stainless steel - 430 ss |
| Number of magnetic fields: | One Pole System |
| Matrix rotational rate: | 0.25 to 2.0 RPM |

The flow rate of diluted drilling fluid through the matrix was 3 gallons per minute. Water was introduced immediately downstream of the diluted drilling fluid feed to the magnetic separator at a rate of 1 to 2 gallons per minute. The purity of hematite recovered increased from 92 weight percent to 95 weight percent and the amount of hematite recovered increased at the 1 gal/min rate and increased at the 2 gal/min rate. A summary of the tests results is shown in Table 2.

TABLE 2

| | Water Flow Rate | | |
|---|---|---|---|
| | No Water | 1 Gal./Minute | 2 Gal./Minute |
| Purity of Hematite | 96.8% | 97.5% | 97.3% |
| Hematite Recovered | 72 | 68 | 75 |

Effect of Introducing Air

The effect of introducing air in the separation zone of the magnetic separator described above was also tested. Compressed air at the rate of 20 to 40 scfm (std. ft.$^3$/min.) from four injection nozzles was introduced into the separation zone of the magnetic separator. The air, like the water, assists in flushing the clays or other low magnetic solids out of the separation zone which increases the purity of the hematite recovered. The less-magnetic particles which are not sufficiently magnetic to adhere to the matrix collection sites can be entrapped in the matrix by being caught and held between two or more magnetic particles which are attracted and held to the collection sites. The air and water free at least some of the less-magnetic particles, thus improving the quality of separation of the more-magnetic particles from the less-magnetic particles. Results of passing air through the separator are shown in Table 3. Surprisingly, the hematite purity increased with no loss in hematite recovered.

TABLE 3

| | No Air Flow (wt. %) | Air Flow (1.1 m$^3$/sec) |
|---|---|---|
| Purity | 96.7 | 97.5 |
| Recover | 70 | 72 |

The principle of the invention and the best mode in which it is contemplated to apply that principle have been described. It is to be understood that the foregoing is illustrative only and that other means and techniques can be used without departing from the true scope of the invention defined in the following claims.

What we claim is:

1. A method for treating drilling fluid discharged from a well, said drilling fluid containing drill cuttings and paramagnetic materials, comprising the steps of:

(a) passing the drilling fluid through a high-gradient magnetic separator to separate the paramagnetic materials from the drilling fluid;

(b) discharging the paramagnetic materials from the magnetic separator, said paramagnetic materials being substantially free of the drilling fluid;

(c) passing the drilling fluid through a centrifuge separator to remove the drill cuttings from the drilling fluid; and (d) after step (b), returning the paramagnetic materials to the well for reuse.

2. The method of claim 1 further comprises, after step (c), returning the drilling fluid to the well for reuse.

3. The method of claim 1 further comprising adding water to the drilling fluid before passing the drilling fluid through the high-gradient magnetic separator.

4. The method of claim 1 further comprising introducing air into the drilling fluid as the drilling fluid passes through the high-gradient magnetic separator.

5. The method of claim 1 further comprising introducing both air and water to the drilling fluid while the drilling fluid is in the magnetic field of the high-gradient magnetic separator.

6. A method for treating drilling fluid discharged from a well, said drilling fluid containing drill cuttings and hematite, comprising the steps of:

(a) passing the drilling fluid through a high-gradient magnetic separator to separate the hematite from the drilling fluid;

(b) discharging from the magnetic separator the hematite, said hematite being substantially free of drilling fluid;

(c) passing the drilling fluid through a centrifuge separator to remove the drill cuttings from the drilling fluid; and (d) after step (b), returning the hematite to the well for reuse.

* * * * *